(12) United States Patent
Fujii et al.

(10) Patent No.: US 10,890,902 B2
(45) Date of Patent: Jan. 12, 2021

(54) POWER PLANT ANALYSIS DEVICE, POWER PLANT ANALYSIS METHOD, AND PROGRAM

(71) Applicant: Mitsubishi Hitachi Power Systems, Ltd., Kanagawa (JP)

(72) Inventors: Keita Fujii, Yokohama (JP); Yoshimichi Nishigaki, Yokohama (JP); Naoki Sakagami, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 351 days.

(21) Appl. No.: 15/763,300

(22) PCT Filed: Sep. 28, 2016

(86) PCT No.: PCT/JP2016/078561
§ 371 (c)(1),
(2) Date: Mar. 26, 2018

(87) PCT Pub. No.: WO2017/057425
PCT Pub. Date: Apr. 6, 2017

(65) Prior Publication Data
US 2018/0275641 A1 Sep. 27, 2018

(30) Foreign Application Priority Data
Sep. 29, 2015 (JP) .................. 2015-190951

(51) Int. Cl.
*G05B 23/02* (2006.01)
*G06Q 50/06* (2012.01)
(Continued)

(52) U.S. Cl.
CPC .............. *G05B 23/02* (2013.01); *F01K 3/262* (2013.01); *F01K 13/02* (2013.01); *G05B 19/042* (2013.01);
(Continued)

(58) Field of Classification Search
None
See application file for complete search history.

(56) References Cited

U.S. PATENT DOCUMENTS

| 2003/0097194 A1* | 5/2003 | Gade | G05B 13/026 |
|---|---|---|---|
| | | | 700/52 |
| 2004/0102872 A1* | 5/2004 | Schick | B23Q 41/00 |
| | | | 700/286 |

(Continued)

FOREIGN PATENT DOCUMENTS

| JP | 2005-045900 | 2/2005 |
|---|---|---|
| JP | 2014-096025 | 5/2014 |
| JP | 2014-106627 | 6/2014 |

OTHER PUBLICATIONS

International Search Report dated Dec. 13, 2016 in International (PCT) Application No. PCT/JP2016/078561, with English Translation.

(Continued)

*Primary Examiner* — Roy Y Yi
(74) *Attorney, Agent, or Firm* — Wenderoth, Lind & Ponack, L.L.P.

(57) ABSTRACT

An operation data acquisition unit is configured to acquire, from an operation data storage unit for storing operation data collected every first period from a power plant, the operation data collected during a latest second period that is longer than the first period. A unit profit amount calculation unit is configured to calculate an average amount of profit per unit time in relation to a unit amount of performance improvement of the power plant based on the operation data that has been acquired.

12 Claims, 12 Drawing Sheets

(51) Int. Cl.
*G06Q 10/06* (2012.01)
*F01K 13/02* (2006.01)
*G05B 19/042* (2006.01)
*F01K 3/26* (2006.01)
*H02J 3/38* (2006.01)
*H02J 3/00* (2006.01)
*H02J 13/00* (2006.01)

(52) U.S. Cl.
CPC ... *G06Q 10/0639* (2013.01); *G06Q 10/06375* (2013.01); *G06Q 50/06* (2013.01); *H02J 3/00* (2013.01); *H02J 3/005* (2013.01); *H02J 3/38* (2013.01); *H02J 13/00* (2013.01); *G05B 2219/2639* (2013.01); *H02J 2203/20* (2020.01); *Y02E 40/70* (2013.01); *Y02E 60/00* (2013.01); *Y04S 10/12* (2013.01); *Y04S 10/30* (2013.01)

(56) References Cited

U.S. PATENT DOCUMENTS

| | | | | |
|---|---|---|---|---|
| 2005/0044477 A1* | 2/2005 | Kubo | ............... | G06Q 10/04 |
| | | | | 715/229 |
| 2012/0239164 A1* | 9/2012 | Smith | ............... | G06Q 50/06 |
| | | | | 700/17 |

OTHER PUBLICATIONS

Written Opinion of the International Searching Authority dated Dec. 13, 2016 in International (PCT) Application No. PCT/JP2016/078561, with English Translation.

\* cited by examiner

| MENU ID | PART | PRICE | AMOUNT OF OUTPUT IMPROVEMENT | PRICE PER UNIT AMOUNT OF OUTPUT IMPROVEMENT |
|---|---|---|---|---|
| 1 | A | $150 | 2 kW | $75 |
| 2 | A, B | $250 | 3 kW | $83 |
| 3 | A, B, C | $1250 | 5.5 kW | $227 |
| 4 | A, B, C, D | $3250 | 6.5 kW | $500 |

FIG. 2

| PART | PRICE | AMOUNT OF OUTPUT IMPROVEMENT | PRICE PER UNIT AMOUNT OF OUTPUT IMPROVEMENT |
|---|---|---|---|
| A | $150 | 2 kW | $75 |
| B | $100 | 1 kW | $100 |
| C | $1000 | 2.5 kW | $400 |
| D | $2000 | 1 kW | $2000 |

FIG. 3

| MENU ID | PART | PRICE | AMOUNT OF EFFICIENCY IMPROVEMENT | PRICE PER UNIT AMOUNT OF EFFICIENCY IMPROVEMENT |
|---|---|---|---|---|
| 1 | A | $150 | 2% | $75 |
| 2 | A, B | $250 | 3% | $83 |
| 3 | A, B, C | $1250 | 5.5% | $227 |
| 4 | A, B, C, D | $3250 | 6.5% | $500 |

| MENU ID | PART | PRICE | AMOUNT OF EFFICIENCY IMPROVEMENT | CONVERSION PERIOD |
|---|---|---|---|---|
| 1 | A | $150 | 2% | 10 DAYS |
| 2 | A, B | $250 | 3% | 15 DAYS |
| 3 | A, B, C | $1250 | 5.5% | 30 DAYS |
| 4 | A, B, C, D | $3250 | 6.5% | 30 DAYS |

FIG. 9

| MENU ID | PART | PRICE | AMOUNT OF OUTPUT IMPROVEMENT | AMORTIZATION COST |
|---|---|---|---|---|
| 1 | A | $150 | 2 kW | $15/YEAR |
| 2 | A, B | $250 | 3 kW | $20/YEAR |
| 3 | A, B, C | $1250 | 5.5 kW | $120/YEAR |
| 4 | A, B, C, D | $3250 | 6.5 kW | $220/YEAR |

FIG. 12

| PART | PRICE | AMOUNT OF OUTPUT IMPROVEMENT | AMORTIZATION PERIOD | AMORTIZATION COST |
|---|---|---|---|---|
| A | $150 | 2 kW | 10 YEARS | $15/YEAR |
| B | $100 | 1 kW | 20 YEARS | $5/YEAR |
| C | $1000 | 2.5 kW | 10 YEARS | $100/YEAR |
| D | $2000 | 1 kW | 20 YEARS | $100/YEAR |

FIG. 13

POWER PLANT ANALYSIS DEVICE, POWER PLANT ANALYSIS METHOD, AND PROGRAM

CROSS-REFERENCE TO RELATED APPLICATION

This application claims priority based on JP 2015-190951 filed in Japan on Sep. 29, 2015, of which the contents are incorporated herein by reference.

TECHNICAL FIELD

The present invention relates to a power plant analysis device, a method for analyzing a power plant, and a program.

BACKGROUND ART

JP 2014-106627 A discloses a technology for evaluating economic efficiency of upgrade components. The technology disclosed in JP 2014-106627 A calculates an economic efficiency evaluation score by subtracting a fuel cost, a regular inspection cost, and a component cost from an income from sales of power.

SUMMARY OF INVENTION

Technical Problem

A power plant is not necessarily operated at a base load all the time. For example, a power plant may be activated and stopped on a daily basis. A power plant may be operated at a partial load. Economic efficiency of upgrading a power plant varies depending on a method for operating the power plant.

In recent years, an owner of a power plant sometimes changes a method for operating the power plant due to the introduction of the newest gas turbine combined cycle (GTCC), the introduction of renewable energy, or other circumstances. Thus, there is a possibility that the latest method for operating a power plant is not reflected in an economic efficiency evaluation by the technology disclosed in JP 2014-106627 A.

An object of the present invention is to provide a power plant analysis device, a method for analyzing a power plant, and a program capable of evaluating the amount of profits in view of the latest method for operating a power plant.

Solution to Problems

According to a first aspect of the present invention, a power plant analysis device includes: an operation data acquisition unit configured to acquire, from an operation data storage unit configured to store operation data collected every first period from a power plant, the operation data collected during the latest second period that is longer than the first period; and a unit profit amount calculation unit configured to calculate an average amount of profits per unit time in relation to a unit amount of performance improvement of the power plant on the basis of the operation data acquired.

According to a second aspect of the present invention, the power plant analysis device according to the first aspect further includes a utilization rate calculation unit configured to calculate a utilization rate of the power plant on the basis of the operation data acquired. The unit profit amount calculation unit calculates an average amount of profits per unit time in relation to the unit amount of performance improvement of the power plant on the basis of the utilization rate.

According to a third aspect of the present invention, in the power plant analysis device according to the second aspect, the unit amount of performance improvement is a unit amount of output improvement, and the utilization rate calculation unit calculates a proportion of a period of duration of operation at not less than a predetermined load in the second period as the utilization rate of the power plant on the basis of the operation data acquired.

According to a fourth aspect of the present invention, in the power plant analysis device according to the second aspect, the unit amount of performance improvement is a unit amount of efficiency improvement, and the utilization rate calculation unit calculates an average value of load percentages of operation in the second period as the utilization rate of the power plant on the basis of the operation data acquired.

According to a fifth aspect of the present invention, the power plant analysis device according to any one of the first to the fourth aspects includes: an upgrade information storage unit configured to store each of upgrade menus of the power plant associated with a price of the upgrade menu and an amount of performance improvement of the power plant due to application of the upgrade menu; and an output unit configured to output information based on the average amount of profits calculated by the unit profit amount calculation unit and the price of the upgrade menu.

According to a sixth aspect of the present invention, in the power plant analysis device according to the fifth aspect, the upgrade information storage unit stores amortization information about an amortization period of the upgrade menu associated with the upgrade menu, and the output unit outputs information based on the average amount of profits calculated by the unit profit amount calculation unit, the price of the upgrade menu, and the amortization information.

According to a seventh aspect of the present invention, in the power plant analysis device according to the fifth or the sixth aspect, the upgrade menu includes one upgrade part or a combination of upgrade parts.

According to an eighth aspect of the present invention, in the power plant analysis device according to any one of the fifth to the seventh aspects, the output unit outputs information based on the average amount of profits calculated by the unit profit amount calculation unit, the price of the upgrade menu, and a conversion period needed for conversion of the power plant by the upgrade menu.

According to a ninth aspect of the present invention, the power plant analysis device according to any one of the fifth to the seventh aspects further includes a profit amount calculation unit configured to calculate an average amount of profits per unit time increased by performance improvement due to application of the upgrade menu on the basis of the average amount of profits calculated by the unit profit amount calculation unit. The output unit outputs information based on the average amount of profits calculated by the profit amount calculation unit and the price of the upgrade menu.

According to a tenth aspect of the present invention, the power plant analysis device according to any one of the first to the ninth aspects further includes a price acquisition unit configured to acquire at least one of the latest power sales price and the latest fuel price. The unit profit amount calculation unit calculates an average amount of profits per unit time in relation to the unit amount of performance improvement of the power plant on the basis of the price acquired and the operation data acquired.

According to an eleventh aspect of the present invention, in the power plant analysis device according to any one of the first to the tenth aspects, the power plant includes at least one of a gas turbine, a steam turbine, and an exhaust heat recovery boiler.

According to a twelfth aspect of the present invention, a method for analyzing a power plant includes: an acquisition step of acquiring, among operation data collected every first period from a power plant, the operation data collected during the latest second period that is longer than the first period; and a unit profit amount calculation step of calculating an average amount of profits per unit time in relation to a unit amount of performance improvement of the power plant on the basis of the operation data acquired.

According to a thirteenth aspect of the present invention, a program causes a computer to function as an operation data acquisition unit configured to acquire, from an operation data storage unit configured to store operation data collected every first period from a power plant, the operation data collected during the latest second period that is longer than the first period, and a unit profit amount calculation unit configured to calculate an average amount of profits per unit time in relation to a unit amount of performance improvement of the power plant on the basis of the operation data acquired.

Advantageous Effects of Invention

According to at least one aspect of the above-described aspects, the power plant analysis device calculates an average amount of profits per unit time on the basis of the latest operation data of a power plant. Thus, the power plant analysis device can calculate the average amount of profits according to the latest method for operating the power plant.

BRIEF DESCRIPTION OF DRAWINGS

FIG. 2 is an example of information stored in an upgrade information storage unit according to the first embodiment.

FIG. 3 is a diagram illustrating an example of upgrade parts applied to an upgrade menu according to the first embodiment.

FIG. 9 is an example of information stored in an upgrade information storage unit according to the third embodiment.

FIG. 12 is an example of information stored in an upgrade information storage unit according to the fourth embodiment.

FIG. 13 is a diagram illustrating an example of upgrade parts applied to an upgrade menu according to the fourth embodiment.

DESCRIPTION OF EMBODIMENTS

First Embodiment

Embodiments will be described below in detail with reference to the drawings.

Figure 1:
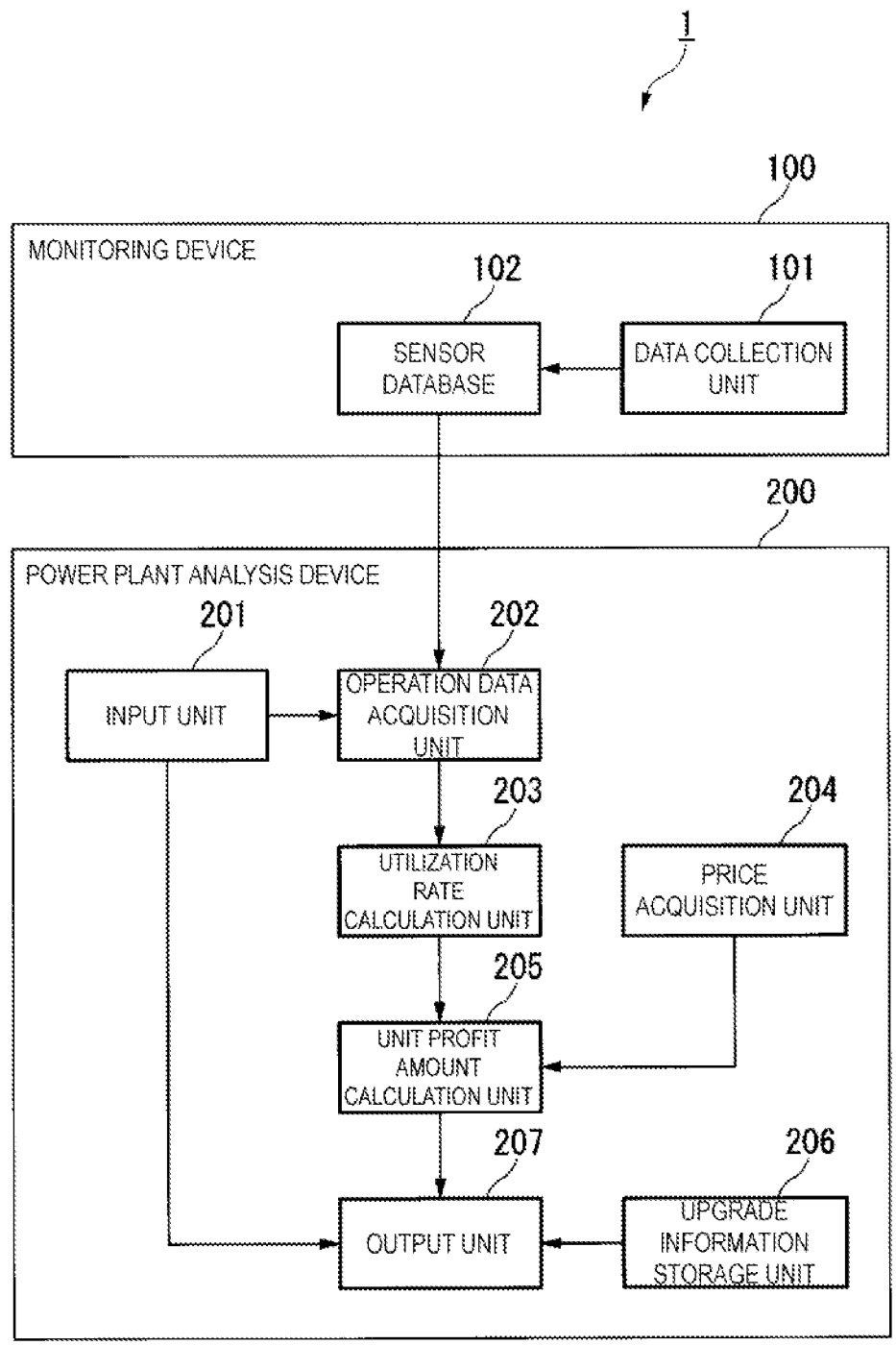
FIG. 1 is a schematic block diagram illustrating a configuration of a power plant analysis system according to a first embodiment.

FIG. 1 is a schematic block diagram illustrating a configuration of a power plant analysis system according to a first embodiment.

A power plant analysis system 1 outputs proposal information that proposes an upgrade menu of a power plant in view of economic efficiency. Specifically, the power plant analysis system 1 generates proposal information on the basis of the amount of profits per unit output of the power plant and the upgrade menu. In the present embodiment, the power plant as a subject of an analysis is a thermal power plant including at least one of a gas turbine, a steam turbine, and an exhaust heat recovery boiler. Output improvement by the application of the upgrade menu is an example of performance improvement.

The power plant analysis system 1 includes a monitoring device 100 and a power plant analysis device 200.

The monitoring device 100 collects operation data in real time from a power plant owned by a customer. Specifically, the monitoring device 100 collects operation data every first period (for example, five minutes) from the power plant. The first period is a short period to the extent that immediacy of monitoring is not lost. The operation data is collected regardless of whether or not the power plant is in operation.

The monitoring device 100 includes a data collection unit 101 and a sensor database 102.

The data collection unit 101 collects the operation data every first period from a sensor provided on equipment forming the power plant. The data collection unit 101 records, in the sensor database 102, the collected operation data associated with identification information about the power plant, identification information about the equipment, and a collected time. The sensor database 102 is an example of an operation data storage unit that stores the operation data collected every first period from the power plant.

The power plant analysis device 200 analyzes the amount of profits of the power plant on the basis of the operation data collected by the monitoring device 100.

The power plant analysis device 200 includes an input unit 201, an operation data acquisition unit 202, a utilization rate calculation unit 203, a price acquisition unit 204, a unit profit amount calculation unit 205, an upgrade information storage unit 206, and an output unit 207.

The input unit 201 accepts an input of identification information about the power plant being an analysis subject. The input unit 201 accepts an input of a target period for collecting a cost of an upgrade menu.

The operation data acquisition unit 202 collects the operation data about the power plant being an analysis subject in the latest second period (for example, a year) from the sensor database 102. The second period is a long period to the extent that a utilization rate of the power plant can be specified. In other words, the second period is a period longer than the first period.

The utilization rate calculation unit 203 calculates a utilization rate of the power plant on the basis of the operation data acquired by the operation data acquisition unit 202.

The price acquisition unit 204 acquires the latest power sales price and the latest fuel price in the power plant being an analysis subject. For example, the price acquisition unit 204 can acquire a standard power sales price and a standard fuel price in a region provided with the power plant via a network. For example, the price acquisition unit 204 can acquire a power sales price and a fuel price notified from an owner of the power plant.

The unit profit amount calculation unit 205 calculates an average amount of profits per unit time in relation to the unit amount of output improvement of the power plant being an analysis subject on the basis of the utilization rate calculated by the utilization rate calculation unit 203 and the power sales price and the fuel price acquired by the price acquisition unit 204. In the present embodiment, the unit profit amount calculation unit 205 calculates an average amount of profits per hour in a case where an output of the power plant is improved by 1 kW without changing the amount of fuel usage. The average amount of profits is equal to an amount obtained by dividing the amount of profits in uptime by a sum of the uptime and downtime.

The upgrade information storage unit 206 stores an application price and the amount of output improvement for each upgrade menu of the power plant. The upgrade menu stored by the upgrade information storage unit 206 is indicated by one upgrade part or a combination of a plurality of upgrade parts.

The output unit 207 generates proposal information about the upgrade menu on the basis of the price of the upgrade menu stored by the upgrade information storage unit 206 and the average amount of profits calculated by the profit amount calculation unit 209, and outputs the proposal information. Examples of an output form of the proposal information include displaying on a display, recording in a storage medium, and printing on a sheet.

FIG. 2 is an example of information stored in the upgrade information storage unit according to the first embodiment.

As illustrated in FIG. 2, the upgrade information storage unit 206 stores a menu ID, a combination of upgrade parts, a price, the amount of output improvement, and a price per unit amount of output improvement for each upgrade menu. The price per unit amount of output improvement can be obtained by dividing the amount of output improvement by the price, so that the upgrade information storage unit 206 according to another embodiment may not store the value.

FIG. 3 is a diagram illustrating an example of upgrade parts applied to an upgrade menu according to the first embodiment. The price of the upgrade menu illustrated in FIG. 2 is obtained as a sum of prices of the upgrade parts illustrated in FIG. 3. The amount of output improvement of the upgrade menu illustrated in FIG. 2 is obtained as a sum of the amounts of output improvement of the upgrade parts illustrated in FIG. 3. Thus, the upgrade information storage unit 206 according to another embodiment may store the table of the upgrade parts illustrated in FIG. 3, and the price, the amount of output improvement, and the price per unit amount of output improvement in the table of the upgrade menu may be omitted.

Next, operations of the power plant analysis device 200 according to the present embodiment are described.

Figure 4:
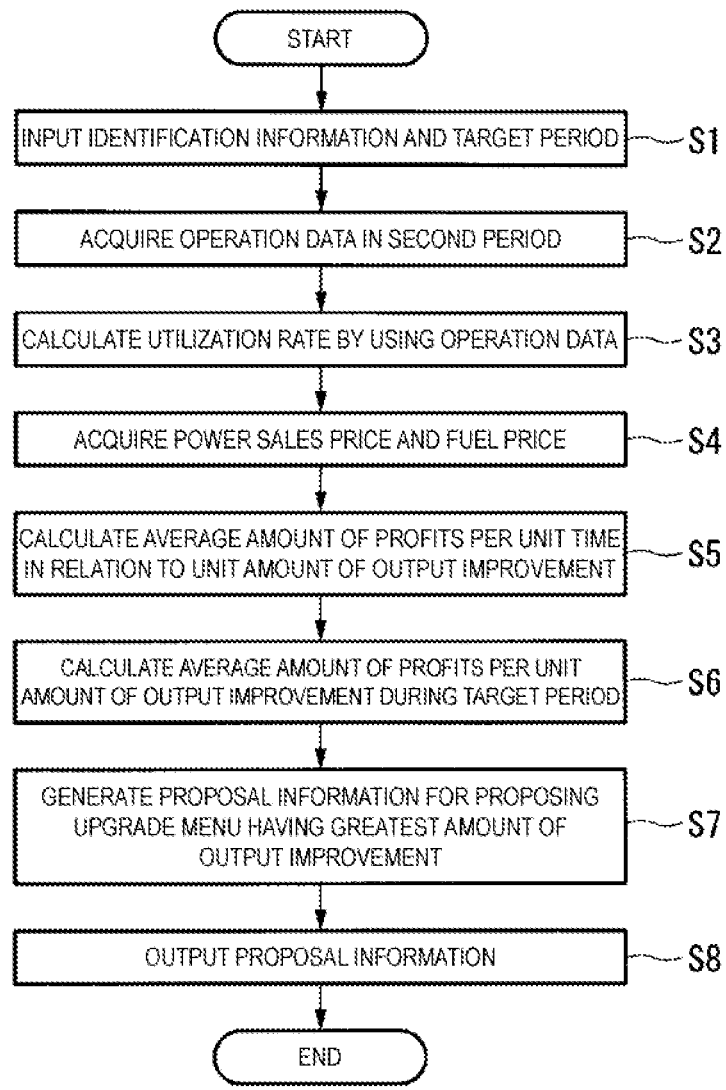
FIG. 4 is a flowchart illustrating operations of a power plant analysis device according to the first embodiment.

FIG. 4 is a flowchart illustrating operations of the power plant analysis device according to the first embodiment.

A user of the power plant analysis device 200 inputs identification information about the power plant being a proposal subject of the upgrade menu and a target period for collecting a cost of the upgrade menu to the power plant analysis device 200. The input unit 201 of the power plant analysis device 200 accepts the input of the identification information about the power plant and the target period for collecting the cost (step S1). The operation data acquisition unit 202 acquires operation data collected during the latest second period among operation data associated with the identification information input to the input unit 201, from the sensor database 102 of the monitoring device 100 (step S2). Specifically, the operation data acquisition unit 202 acquires operation data associated with the input identification information and with a collected time during the latest second period in the sensor database 102.

The utilization rate calculation unit 203 calculates a utilization rate of the power plant on the basis of the operation data acquired by the operation data acquisition unit 202 (step S3). Specifically, the utilization rate calculation unit 203 calculates the utilization rate by the following procedure. The utilization rate calculation unit 203 first calculates a total operating time of base load operation in the power plant on the basis of the operation data acquired by the operation data acquisition unit 202. The base load operation may not necessarily be operation at a 100% load. For example, the utilization rate calculation unit 203 calculates a total operating time of operation at not less than a predetermined load such as a load of not less than 90%. Next, the utilization rate calculation unit 203 calculates a utilization rate by dividing the calculated total operating time by a time of the second period. In other words, the utilization rate calculation unit 203 calculates a base load operation rate in the second period of the power plant.

Next, the price acquisition unit 204 acquires the latest power sales price and the latest fuel price in the power plant being an analysis subject (step S4). The power sales price is indicated by a price per unit amount of power ($/kWh). The fuel price is indicated by a price per unit flow rate ($/kg).

The unit profit amount calculation unit 205 calculates an average amount of profits P ($/kWh) per unit time in relation to the unit amount of output improvement on the basis of a utilization rate R (%) calculated by the utilization rate calculation unit 203 and a power sales price S ($/kWh) and a fuel price B ($/kg) acquired by the price acquisition unit 204 (step S5). Specifically, the unit profit amount calculation unit 205 calculates the average amount of profits P per unit time in relation to the unit amount of output improvement on the basis of an expression (1) indicated below.

$$P = (S - B \times F) \times R/100 \qquad (1)$$

Herein, F is a fuel flow rate (kg/kWh) needed to generate the unit amount of power in the base load operation. This flow rate is specified from the operation data.

The output unit 207 calculates, by multiplying the average amount of profits calculated by the unit profit amount calculation unit 205 by a target period (h) input to the input unit 201, an average amount of profits ($/kW) per unit amount of output improvement during the target period (step S6). Next, the output unit 207 makes reference to the upgrade information storage unit 206 and generates proposal information for proposing an upgrade menu having the greatest amount of output improvement among upgrade menus associated with a price per unit amount of output improvement lower than the average amount of profits per unit amount of output improvement during the target period (step S7). The output unit 207 outputs the generated proposal information (step S8).

Herein, a method for generating proposal information in the present embodiment is described with an example of the upgrade menu illustrated in FIG. 2.

Figures 5, 6:
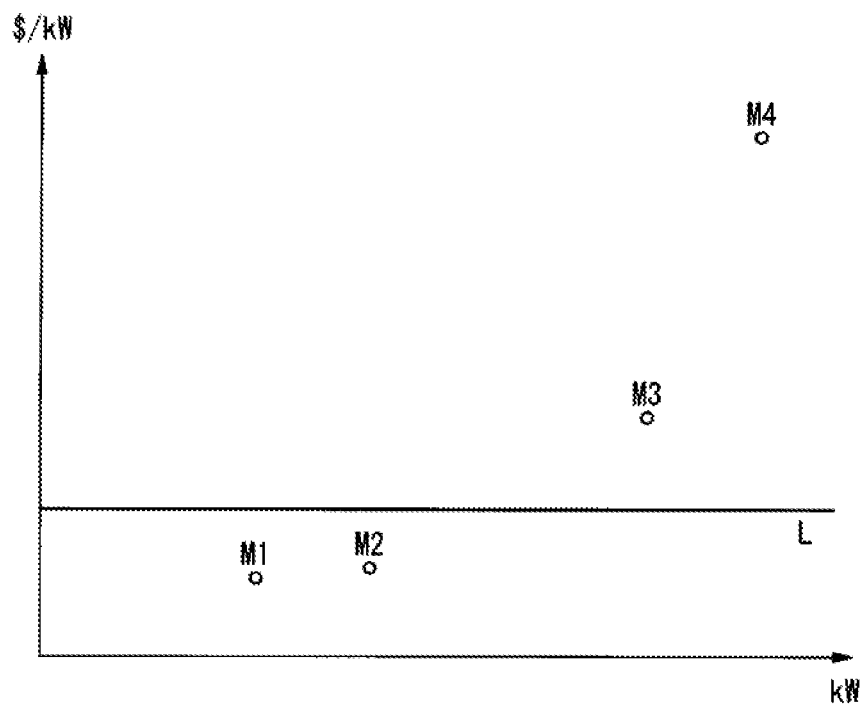
FIG. 5 is a diagram illustrating an example of a relationship between an average amount of profits per unit amount of output improvement during a target period and the upgrade menu.
FIG. 6 is an example of information stored in an upgrade information storage unit according to a second embodiment.

FIG. 5 is a diagram illustrating an example of a relationship between the average amount of profits per unit amount of output improvement during the target period and the upgrade menu.

According to FIG. 5, an upgrade menu M1 to an upgrade menu M4 are plotted on a plane defined by a horizontal axis indicating the amount of output improvement (kW) and a vertical axis indicating a price per unit amount of output improvement ($/kW). These upgrade menus are located in the order of the upgrade menu M1, the upgrade menu M2, the upgrade menu M3, and the upgrade menu M4 from the lower left of the paper plane. A line L indicating the average amount of profits per unit amount of output improvement calculated in the step S6 is provided on the same plane. The plots indicating the upgrade menu M1 and the upgrade menu M2 are positioned in the lower portion of the paper plane with respect to the line L. The plots indicating the upgrade menu M3 and the upgrade menu M4 are positioned in the upper portion of the paper plane with respect to the line L. Thus, it is clear that costs of the upgrade menu M1 and the upgrade menu M2 can be collected within the target period. The upgrade menu M2 has the greatest amount of output improvement among the upgrade menus of which the costs can be collected within the target period. Therefore, the upgrade menu M2 is an upgrade menu being a proposal subject. In other words, the power plant analysis device 200 sets, to a proposal subject, an upgrade menu located the closest to the right side among upgrade menus located in the lower portion of the paper plane with respect to the line L.

In this way, according to the present embodiment, the power plant analysis device 200 outputs proposal information indicating an upgrade menu that enables conversion at a cost collectable within a target period and that has a great amount of output improvement. Thus, a user of the power plant analysis device 200 can propose a suitable upgrade menu to an owner of the power plant.

The proposal information according to the present embodiment indicates an upgrade menu that enables conversion at a cost collectable within a target period and that has a great amount of output improvement, but this is not restrictive. For example, proposal information according to another embodiment may be such a diagram as illustrated in FIG. 5. Proposal information according to another embodiment may indicate an average amount of profits per unit amount of output improvement during a target period.

According to the present embodiment, the power plant analysis device 200 calculates an average amount of profits per unit time in relation to the unit amount of output improvement by using operation data collected during the latest second period that is longer than the first period among the operation data collected every first period from the power plant. Thus, the power plant analysis device 200 can calculate the amount of profits per unit time on the basis of the latest operation method even in a case where the method for operating a power plant changes.

According to the present embodiment, the power plant analysis device 200 calculates a utilization rate of the power plant on the basis of the operation data and calculates an average amount of profits per unit time in relation to the unit amount of output improvement on the basis of the utilization rate. Thus, the power plant analysis device 200 can quickly calculate the amount of profits per unit time by simple calculation.

The power plant analysis device 200 calculates a utilization rate of the power plant by calculating a proportion of a period of duration of operation at not less than a predetermined load in the second period. This is because the amount of output improvement stored in the upgrade information storage unit 206 is specified based on an output in the base load operation. The amount of output improvement of the power plant is smaller than the amount of output improvement stored in the upgrade information storage unit 206 during partial load operation of the power plant. Thus, the utilization rate used for calculating the amount of profits without including a utilization rate by the partial load operation allows an error to be reduced in the amount of profits calculated by the upgrade information storage unit 206.

On the other hand, the power plant analysis device 200 according to another embodiment may calculate the amount of profits per unit time by another method. For example, the unit profit amount calculation unit 205 according to another embodiment may calculate the amount of profits per unit time on the basis of a fuel flow rate consumed in base load operation specified from operation data and an amount of power generated during the base load operation. In other words, the unit profit amount calculation unit 205 may not necessarily calculate the amount of profits per unit time on the basis of a utilization rate.

The power plant analysis device 200 according to the present embodiment further includes the price acquisition unit 204 that acquires the latest power sales price and the latest fuel price. Thus, the power plant analysis device 200 can calculate the amount of profits on the basis of the actual power sales price and the actual fuel price of the power plant. On the other hand, the power plant analysis device 200 according to another embodiment may not necessarily calculate the amount of profits on the basis of the latest power sales price and the latest fuel price. For example, the price acquisition unit 204 may acquire the latest power sales price or the latest fuel price. The power plant analysis device 200 may calculate the amount of profits on the basis of at least one of a preset power sales price and a preset fuel price.

Second Embodiment

A second embodiment of the present invention will be described below.

The power plant analysis system 1 according to the first embodiment generates proposal information on the basis of the amount of profits per unit output of a power plant and an upgrade menu. In contrast, a power plant analysis system 1 according to the second embodiment generates proposal information on the basis of the amount of profits per unit amount of efficiency improvement of a power plant and an upgrade menu. Efficiency improvement by the application of the upgrade menu is an example of performance improvement.

The power plant analysis system 1 according to the second embodiment has the same configuration as that of the first embodiment. On the other hand, the power plant analysis system 1 according to the second embodiment differs from the first embodiment in the operations of the utilization rate calculation unit 203 and the unit profit amount calculation unit 205 and in the information stored in the upgrade information storage unit 206.

FIG. 6 is an example of information stored in the upgrade information storage unit according to the second embodiment.

As illustrated in FIG. 6, the upgrade information storage unit 206 stores a menu ID, a combination of upgrade parts, a price, the amount of efficiency improvement, and a price per unit amount of efficiency improvement for each upgrade menu. The price per unit amount of efficiency improvement is obtained by dividing the amount of efficiency improvement by the price.

Next, operations of the power plant analysis device 200 according to the present embodiment are described.

Figure 7:
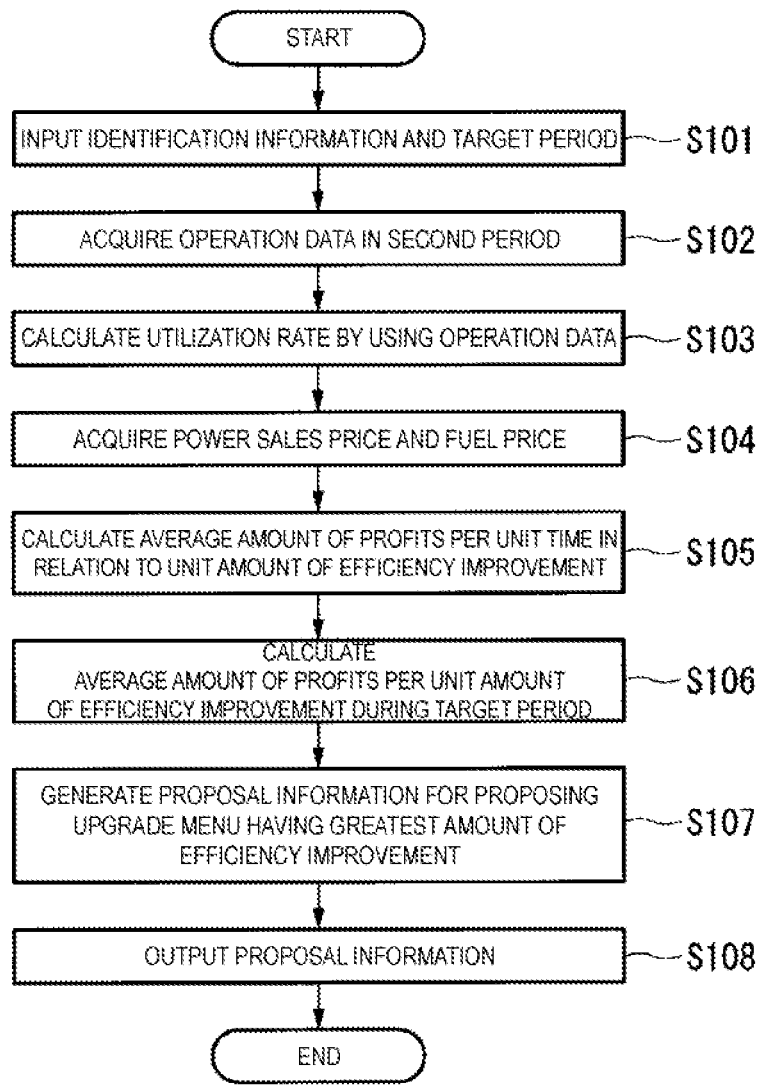
FIG. 7 is a flowchart illustrating operations of a power plant analysis device according to the second embodiment.

FIG. 7 is a flowchart illustrating operations of the power plant analysis device according to the second embodiment.

A user of the power plant analysis device 200 inputs identification information about a power plant being a proposal subject of the upgrade menu and a target period for collecting a cost of the upgrade menu to the power plant analysis device 200. The input unit 201 of the power plant analysis device 200 accepts the input of the identification information about the power plant and the target period for collecting the cost (step S101). The operation data acquisition unit 202 acquires operation data collected during the latest second period among operation data associated with the identification information input to the input unit 201, from the sensor database 102 of the monitoring device 100 (step S102). Specifically, the operation data acquisition unit 202 acquires operation data associated with the input identification information and with a collected time during the latest second period in the sensor database 102.

The utilization rate calculation unit 203 calculates a utilization rate of the power plant on the basis of the operation data acquired by the operation data acquisition unit 202 (step S103). Specifically, the utilization rate calculation unit 203 calculates the utilization rate by the following procedure. The utilization rate calculation unit 203 first calculates a load percentage of the power plant at each collected time on the basis of the operation data. The load percentage when the power plant is operated in base load operation is 100%. The load percentage when the power plant stops is 0%. The utilization rate calculation unit 203 calculates a utilization rate by dividing the total sum of calculated load percentages by the total number of collected times. In other words, the utilization rate calculation unit 203 calculates an average load percentage of the power plant as a utilization rate.

Next, the price acquisition unit 204 acquires the latest fuel price in the power plant being an analysis subject (step S104). The unit profit amount calculation unit 205 calculates an average amount of profits P per unit time in relation to the unit amount of output improvement on the basis of a utilization rate R (%) calculated by the utilization rate calculation unit 203 and a fuel price B ($/kg) acquired by the price acquisition unit 204 (step S105). Specifically, the unit profit amount calculation unit 205 calculates the average amount of profits P ($/h %) per unit time in relation to the unit amount of efficiency improvement on the basis of an expression (2) indicated below.

$$P=(B \times F) \times (R/100) \times (1/100) \quad (2)$$

Herein, F is a fuel flow rate (kg/h) needed to operate the plant per unit time in the base load operation. The flow rate F is specified from the operation data.

The average amount of profits P is equivalent to the fuel cost that can be reduced by increasing efficiency of the power plant by the unit amount of efficiency improvement.

The output unit 207 calculates, by multiplying the average amount of profits calculated by the unit profit amount calculation unit 205 by a target period (h) input to the input unit 201, an average amount of profits ($/%) per unit amount of output improvement during the target period (step S106). Next, the output unit 207 makes reference to the upgrade information storage unit 206 and generates proposal information for proposing an upgrade menu having the greatest amount of efficiency improvement among upgrade menus associated with a price per unit amount of efficiency improvement lower than the average amount of profits per unit amount of efficiency improvement during the target period (step S107). The output unit 207 outputs the generated proposal information (step S108).

In this way, according to the present embodiment, the power plant analysis device 200 outputs proposal information indicating an upgrade menu that enables conversion at a cost collectable within a target period and that has a great amount of efficiency improvement. Thus, a user of the power plant analysis device 200 can propose a suitable upgrade menu to an owner of the power plant.

According to the present embodiment, the power plant analysis device 200 calculates a utilization rate of the power plant by calculating an average value of load percentages of operation in the second period. This is because the amount of efficiency improvement stored in the upgrade information storage unit 206 is obtained regardless of a load percentage.

On the other hand, the power plant analysis device 200 according to another embodiment may calculate the amount of profits per unit time by another method. For example, the unit profit amount calculation unit 205 according to another embodiment may calculate the amount of profits per unit time by dividing the product of the total sum of fuel flow rates consumed at times specified from operation data and a fuel unit price by 100. In other words, the unit profit amount calculation unit 205 may not necessarily calculate the amount of profits per unit time on the basis of a utilization rate.

Third Embodiment

A third embodiment of the present invention will be described below.

A power plant analysis system 1 according to the present embodiment generates proposal information on the basis of a conversion period needed for application of an upgrade menu. A profit cannot be obtained during the conversion period for the application of the upgrade menu because a power plant stops. According to the present embodiment, a user of the power plant analysis system 1 can propose a suitable upgrade menu in view of a conversion period.

Figure 8:
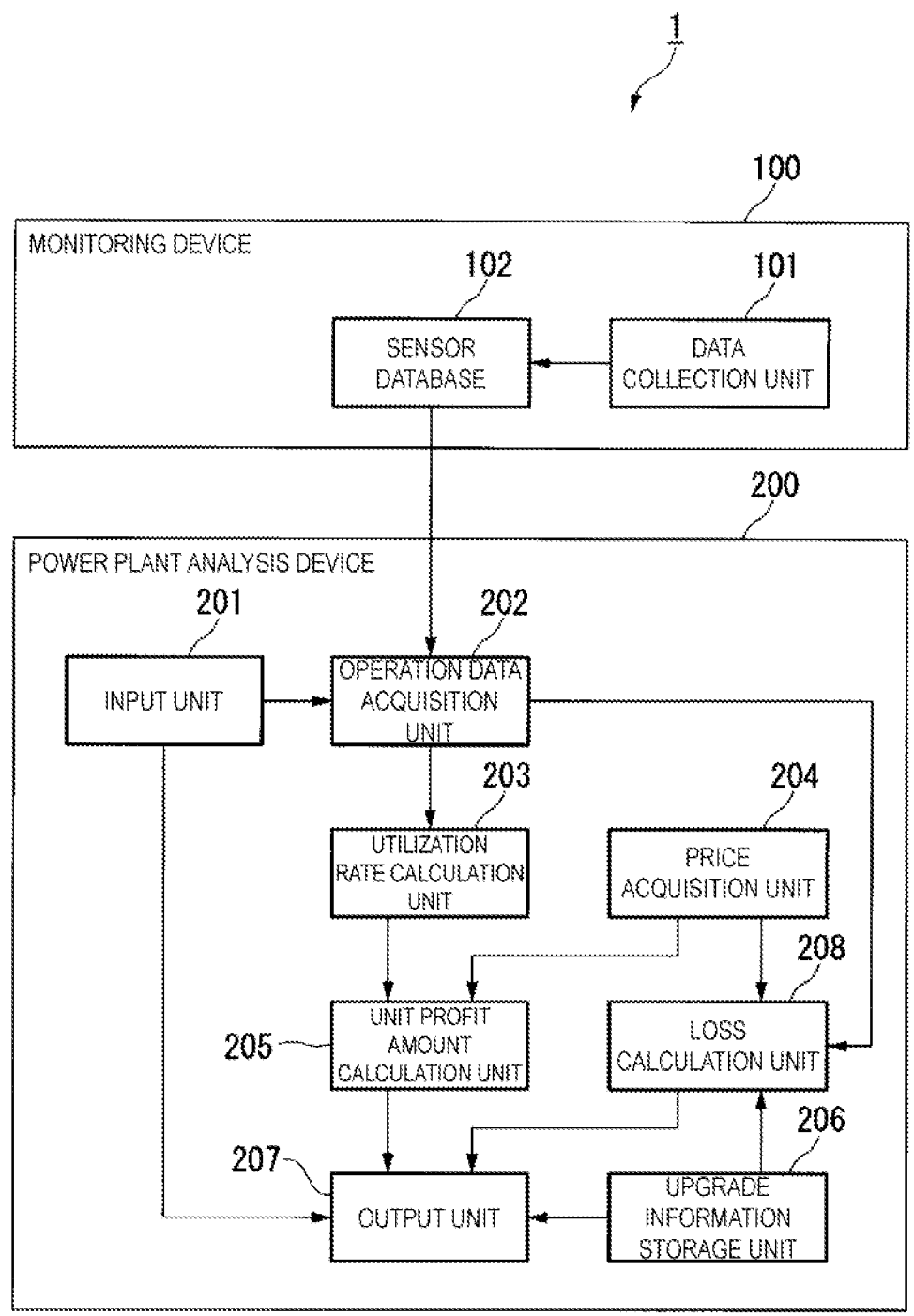
FIG. 8 is a schematic block diagram illustrating a configuration of a power plant analysis system according to a third embodiment.

FIG. 8 is a schematic block diagram illustrating a configuration of the power plant analysis system according to the third embodiment.

The configuration of the power plant analysis system 1 according to the third embodiment further includes a loss calculation unit 208 in addition to the configuration of the first embodiment. The loss calculation unit 208 calculates a loss caused by stopping a power plant during a conversion period. The power plant analysis system 1 according to the third embodiment differs from the first embodiment in the operations of the output unit 207 and the information stored in the upgrade information storage unit 206.

FIG. 9 is an example of information stored in the upgrade information storage unit according to the third embodiment.

As illustrated in FIG. 9, the upgrade information storage unit 206 stores a menu ID, a combination of upgrade parts, a price, the amount of output improvement, and a conversion period for each upgrade menu.

Next, operations of the power plant analysis device 200 according to the present embodiment are described.

Figure 10:
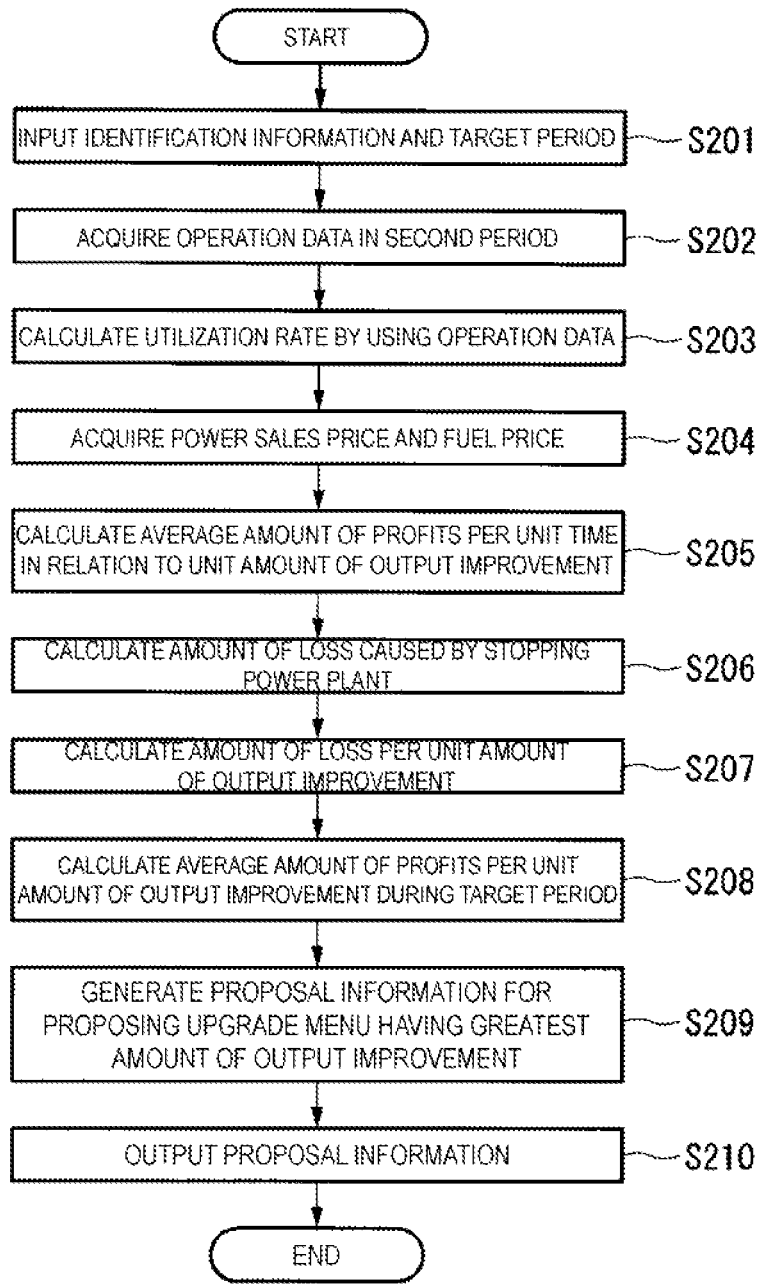
FIG. 10 is a flowchart illustrating operations of a power plant analysis device according to the third embodiment.

FIG. 10 is a flowchart illustrating operations of the power plant analysis device according to the third embodiment.

A user of the power plant analysis device 200 inputs identification information about a power plant being a proposal subject of the upgrade menu and a target period for collecting a cost of the upgrade menu to the power plant analysis device 200. The input unit 201 of the power plant analysis device 200 accepts the input of the identification information about the power plant and the target period for collecting the cost (step S201). The operation data acquisition unit 202 acquires operation data collected during the latest second period among operation data associated with the identification information input to the input unit 201, from the sensor database 102 of the monitoring device 100 (step S202).

The utilization rate calculation unit 203 calculates a utilization rate of the power plant on the basis of the operation data acquired by the operation data acquisition unit 202 (step S203). Specifically, the utilization rate calculation unit 203 calculates the utilization rate by the following procedure. The utilization rate calculation unit 203 first calculates a total operating time of base load operation in the power plant on the basis of the operation data acquired by the operation data acquisition unit 202.

Next, the price acquisition unit 204 acquires the latest power sales price and the latest fuel price in the power plant being an analysis subject (step S204). The unit profit amount calculation unit 205 calculates an average amount of profits per unit time in relation to the unit amount of output improvement on the basis of the utilization rate calculated by the utilization rate calculation unit 203 and the power sales price and the fuel price B acquired by the price acquisition unit 204 (step S205).

The loss calculation unit 208 calculates the amount of loss caused by stopping the power plant for conversion for each of the upgrade menus stored in the upgrade information storage unit 206 (step S206). Specifically, the loss calculation unit 208 calculates the amount of loss by the following procedure. The loss calculation unit 208 first specifies an amount of power generation and a fuel flow rate in the conversion period from the operation data acquired by the operation data acquisition unit 202. Next, the loss calculation unit 208 calculates, as the amount of loss, a difference between an amount obtained by multiplying the calculated amount of power generation by the power sales price and an amount obtained by multiplying the fuel flow rate by the fuel price. The loss calculation unit 208 then calculates the amount of loss per unit amount of output improvement for each of the upgrade menus by dividing the sum of the price of the upgrade menu and the amount of loss calculated in the step S206 by the amount of output improvement (step S207).

The output unit 207 calculates, by multiplying the average amount of profits calculated by the unit profit amount calculation unit 205 by a target period (h) input to the input unit 201, an average amount of profits ($/kW) per unit amount of output improvement during the target period (step S208). Next, the output unit 207 generates proposal information for proposing an upgrade menu having the greatest amount of output improvement among upgrade menus having the amount of loss per unit amount of output improvement calculated by the loss calculation unit 208 lower than the average amount of profits calculated in the step S205 (step S209). The output unit 207 outputs the generated proposal information (step S210).

In this way, according to the present embodiment, the output unit 207 outputs proposal information based on an average amount of profits calculated by the unit profit amount calculation unit 205, a price of an upgrade menu, and a conversion period needed for conversion of a power plant by the upgrade menu. Thus, a user of the power plant analysis system 1 can propose a suitable upgrade menu in view of a conversion period.

The power plant analysis device 200 according to the present embodiment outputs proposal information based on the unit amount of output improvement similarly to the first embodiment, but this is not restrictive. For example, the power plant analysis device 200 according to another embodiment may output proposal information based on the unit amount of efficiency improvement similarly to the second embodiment.

Fourth Embodiment

The power plant analysis system 1 according to the first embodiment to the third embodiment provides information indicating whether or not an initial cost can be collected in a target period as proposal information. In contrast, a power plant analysis system 1 according to a fourth embodiment outputs proposal information indicating a period needed to collect an amortization cost in view of depreciation for each upgrade menu.

Figure 11:
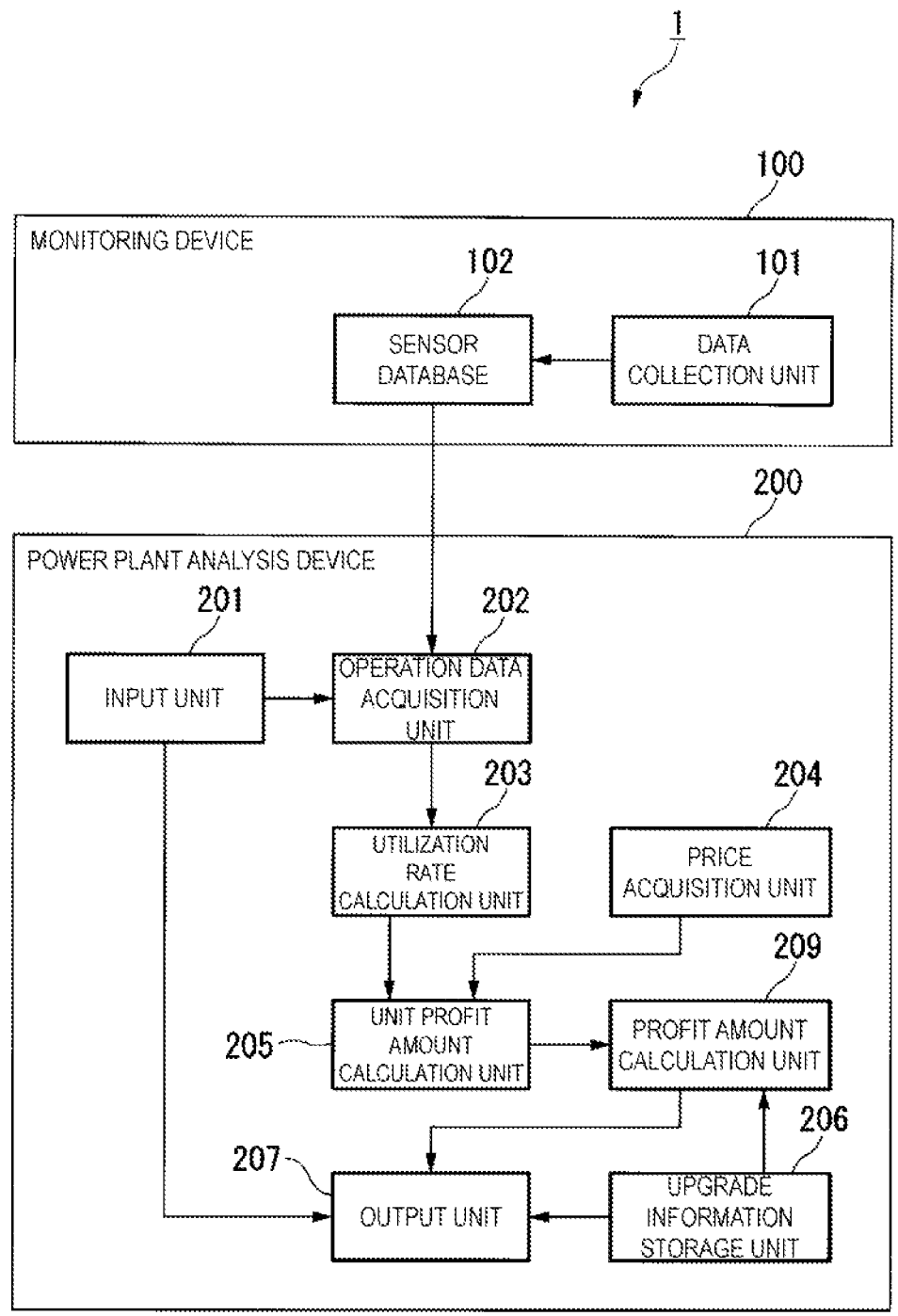
FIG. 11 is a schematic block diagram illustrating a configuration of a power plant analysis system according to a fourth embodiment.

FIG. 11 is a schematic block diagram illustrating a configuration of the power plant analysis system according to the fourth embodiment.

The configuration of the power plant analysis system 1 according to the fourth embodiment further includes a profit amount calculation unit 209 in addition to the configuration of the first embodiment. The profit amount calculation unit 209 calculates an average amount of profits per unit time increased by performance improvement due to application of an upgrade menu on the basis of an average amount of profits calculated by the unit profit amount calculation unit 205. The power plant analysis system 1 according to the third embodiment differs from the first embodiment in the information input to the input unit 201, the operations of the output unit 207, and the information stored in the upgrade information storage unit 206.

FIG. 12 is an example of information stored in the upgrade information storage unit according to the fourth embodiment.

As illustrated in FIG. 12, the upgrade information storage unit 206 stores a menu ID, a combination of upgrade parts, a price, the amount of output improvement, and an amortization cost for each upgrade menu.

FIG. 13 is a diagram illustrating an example of upgrade parts applied to an upgrade menu according to the fourth embodiment. The amortization cost of the upgrade menu illustrated in FIG. 12 is obtained as a sum of amortization costs of the upgrade parts illustrated in FIG. 13. The amortization cost of each of the upgrade parts is obtained by dividing a price by an amortization period.

Next, operations of the power plant analysis device 200 according to the present embodiment are described.

Figure 14:
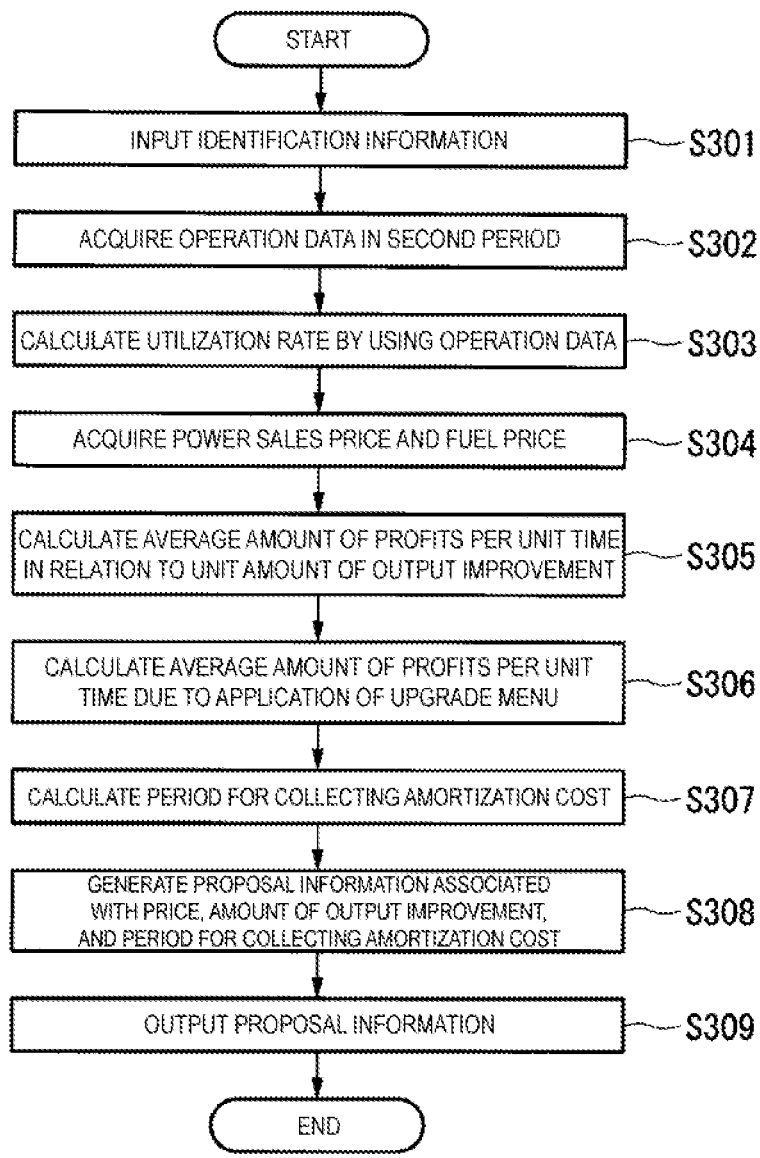
FIG. 14 is a flowchart illustrating operations of a power plant analysis device according to the fourth embodiment.

FIG. 14 is a flowchart illustrating operations of the power plant analysis device according to the fourth embodiment.

A user of the power plant analysis device 200 inputs identification information about a power plant being a proposal subject of the upgrade menu and a target period for collecting a cost of the upgrade menu to the power plant analysis device 200. The input unit 201 of the power plant analysis device 200 accepts the input of the identification information about the power plant (step S301). The operation data acquisition unit 202 acquires operation data collected during the latest second period among operation data associated with the identification information input to the input unit 201, from the sensor database 102 of the monitoring device 100 (step S302). Specifically, the operation data acquisition unit 202 acquires operation data associated with the input identification information and with a collected time during the latest second period in the sensor database 102. The utilization rate calculation unit 203 calculates a utilization rate of the power plant on the basis of the operation data acquired by the operation data acquisition unit 202 (step S303).

Next, the price acquisition unit 204 acquires the latest power sales price and the latest fuel price in the power plant being an analysis subject (step S304). The unit profit amount calculation unit 205 calculates an average amount of profits per unit time in relation to the unit amount of output improvement on the basis of the utilization rate calculated by the utilization rate calculation unit 203 and the power sales price and the fuel price acquired by the price acquisition unit 204 (step S305).

Next, the profit amount calculation unit 209 calculates an average amount of profits per unit time increased by performance improvement due to application of an upgrade menu for each upgrade menu (step S306). Specifically, the profit amount calculation unit 209 multiplies the average amount of profits calculated by the unit profit amount calculation unit 205 by the amount of output improvement of each upgrade menu stored by the upgrade information storage unit 206.

The output unit 207 calculates a period needed to collect an amortization cost of each upgrade menu on the basis of the average amount of profits calculated by the profit amount calculation unit 209 (step S307). Specifically, the output unit 207 calculates a period needed to collect an amortization cost by dividing the amortization cost by the average amount of profits calculated by the profit amount calculation unit 209. Next, the output unit 207 generates, as proposal information, a list associating the price, the amount of output improvement, and the period needed to collect an amortization cost with each upgrade menu (step S308). The output unit 207 outputs the generated proposal information (step S309).

In this way, according to the present embodiment, the power plant analysis device 200 outputs proposal information indicating a period needed to collect an amortization cost in view of depreciation for each upgrade menu. Thus, a user of the power plant analysis device 200 can propose an upgrade menu in view of depreciation of upgrade parts to an owner of the power plant.

The power plant analysis device 200 according to the embodiment outputs proposal information based on the unit amount of output improvement similarly to the first embodiment, but this is not restrictive. For example, the power plant analysis device 200 according to another embodiment may output proposal information based on the unit amount of efficiency improvement similarly to the second embodiment.

The power plant analysis device 200 according to another embodiment may output proposal information based on the conversion period similarly to the third embodiment.

Embodiments have been described so far in detail with reference to the drawings, but a specific configuration is not limited to the above-described configuration, and various design changes or the like are allowed.

For example, the monitoring device 100 and the power plant analysis device 200 according to the above-described embodiments are different devices, but this is not restrictive. For example, the power plant analysis device 200 according to another embodiment may have the function of the monitoring device 100. The power plant analysis system 1 according to another embodiment may have at least one of the function of the monitoring device 100 and the function of the power plant analysis device 200 dispersed in a plurality of devices.

Figure 15:
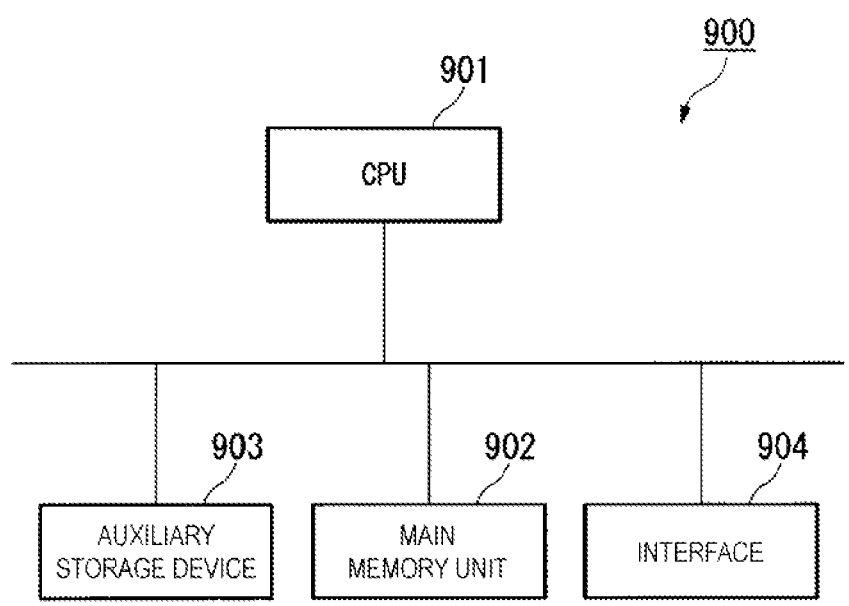
FIG. 15 is a schematic block diagram illustrating a configuration of a computer according to at least one embodiment.

FIG. 15 is a schematic block diagram illustrating a configuration of a computer according to at least one of the embodiments.

A computer 900 includes a CPU 901, a main storage device 902, an auxiliary storage device 903, and an interface 904.

The above-described power plant analysis device 200 is installed in the computer 900. The operation of each of the above-described processing units is stored in the form of a program in the auxiliary storage device 903. The CPU 901 reads out the program from the auxiliary storage device 903, loads the program into the main storage device 902, and performs the above-described processing according to the program. In accordance with the program, the CPU 901 secures a storage region corresponding to the above-described upgrade information storage unit 206 in the main storage device 902 or the auxiliary storage device 903.

In at least one of the embodiments, the auxiliary storage device 903 is an example of non-temporary tangible media. Other examples of the non-temporary tangible media include a magnetic disk, a magneto-optical disk, a CD-ROM, a DVD-ROM, a semiconductor memory, and the like that are connected via the interface 904. In a case where the program is distributed to the computer 900 via a communication line, the computer 900 that receives the distribution may load the program into the main storage device 902 and perform the above-described processing.

The program may realize some of the functions described above. The program may be a program that realizes the functions described above in combination with another program already stored in the auxiliary storage device 903, i.e., a so-called differential file (differential program).

INDUSTRIAL APPLICABILITY

The power plant analysis device calculates an average amount of profits per unit time on the basis of the latest operation data of a power plant. Thus, the power plant analysis device can calculate the average amount of profits according to the latest method for operating the power plant.

REFERENCE SIGNS LIST

1 Power plant analysis system
100 Monitoring device
101 Data collection unit
102 Sensor database
200 Power plant analysis device
201 Input unit
202 Operation data acquisition unit
203 Utilization rate calculation unit
204 Price acquisition unit
205 Unit profit amount calculation unit 206 Upgrade information storage unit
207 Output unit
208 Loss calculation unit
209 Profit amount calculation unit
900 Computer
901 CPU
902 Main storage device
903 Auxiliary storage device
904 Interface

The invention claimed is:

1. A power plant analysis device comprising:
an operation data acquisition unit configured to acquire, from an operation data storage unit configured to store operation data collected every first period from a power plant owned by a customer, the operation data collected during a latest second period that is longer than the first period;
a utilization rate calculation unit configured to calculate a utilization rate of the power plant based on the operation data that has been acquired; and
a unit profit amount calculation unit configured to calculate an average amount of profit per unit time in relation to a unit amount of performance improvement of the power plant based on the utilization rate of the power plant.

2. The power plant analysis device according to claim 1, wherein:
the unit amount of performance improvement of the power plant is a unit amount of output improvement of the power plant; and
the utilization rate calculation unit is configured to calculate a proportion of a period of duration of operation at not less than a predetermined load in the latest second period as the utilization rate of the power plant based on the operation data that has been acquired.

3. The power plant analysis device according to claim 1, wherein:
the unit amount of performance improvement of the power plant is a unit amount of efficiency improvement of the power plant; and
the utilization rate calculation unit is configured to calculate an average value of load percentages of operation in the latest second period as the utilization rate of the power plant based on the operation data that has been acquired.

4. The power plant analysis device according to claim 1, further comprising:
an upgrade information storage unit configured to store each of upgrade menus of the power plant associated with a price of the upgrade menu and an amount of performance improvement of the power plant due to application of the upgrade menu; and
an output unit configured to output information based on the average amount of profit per unit time calculated by the unit profit amount calculation unit and the price of the upgrade menu.

5. The power plant analysis device according to claim 4, wherein:
the upgrade information storage unit is configured to store amortization information about an amortization period of the upgrade menu associated with the upgrade menu; and
the output unit is configured to output information based on the average amount of profit per unit time calculated by the unit profit amount calculation unit, the price of the upgrade menu, and the amortization information.

6. The power plant analysis device according to claim 4, wherein the upgrade menu comprises one upgrade part or a combination of upgrade parts.

7. The power plant analysis device according to claim 4, wherein the output unit is configured to output information based on the average amount of profit per unit time calculated by the unit profit amount calculation unit, the price of the upgrade menu, and a conversion period needed for conversion of the power plant by the upgrade menu.

8. The power plant analysis device according to claim 4, further comprising a profit amount calculation unit configured to calculate an average amount of profit per unit time increased by performance improvement due to application of the upgrade menu based on the average amount of profit per unit time calculated by the unit profit amount calculation unit,
wherein the output unit is configured to output information based on the average amount of profit per unit time calculated by the profit amount calculation unit and the price of the upgrade menu.

9. The power plant analysis device according to claim 1, further comprising a price acquisition unit configured to acquire at least one of a latest power sales price and a latest fuel price,
wherein the unit profit amount calculation unit is configured to calculate the average amount of profit per unit time based on the utilization rate of the power plant.

10. The power plant analysis device according to claim 1, wherein the power plant comprises at least one of a gas turbine, a steam turbine, and an exhaust heat recovery boiler.

11. A method for analyzing a power plant, the method comprising:
acquiring, among operation data collected every first period from a power plant owned by a customer, the operation data collected during a latest second period that is longer than the first period;
calculating a utilization rate of the power plant based on the operation data that has been acquired; and
calculating an average amount of profit per unit time in relation to a unit amount of performance improvement of the power plant based on the utilization rate of the power plant.

12. A non-transitory computer-readable storage medium storing a program causing a computer to function as:
an operation data acquisition unit configured to acquire, from an operation data storage unit configured to store operation data collected every first period from a power plant owned by a customer, the operation data collected during a latest second period that is longer than the first period;
a utilization rate calculation unit configured to calculate a utilization rate of the power plant based on the operation data that has been acquired; and
a unit profit amount calculation unit configured to calculate an average amount of profit per unit time in relation to a unit amount of performance improvement of the power plant based on the utilization rate of the power plant.

* * * * *